3,187,030
POLYMERIZATION OF SILAZANES BY SELECTED CATALYSTS
William M. Boyer, Tinley Park, Ill., and Charles T. Gannon, Indianapolis, Ind., assignors, by mesne assignments, to Dow Corning Corporation, Midland, Mich., a corporation of Michigan
No Drawing. Filed Dec. 1, 1960, Ser. No. 72,869
18 Claims. (Cl. 260—448.2)

This invention is concerned with certain silicon-nitrogen compositions and, more particularly, to advancing the polymerization of such compositions with selected metallic compound catalysts.

Broadly, the silicon-nitrogen compounds contemplated by the present invention are those which may be formed as a result of the reaction between ammonia or primary amines and a halosilane. Halosilanes are defined as silicon halides having one or more halogen atoms attached directly to the silicon. Such halosilanes have the generic formula:

$$R_nSiHal_{4-n}$$

wherein R is hydrogen or a monovalent organic group, for example, monovalent hydrocarbon groups, such as alkyl, aryl, and similar groups. Processes for making these compounds and the compounds themselves are disclosed in a number of patents, for example, Haber 2,462,635 and Cheronis 2,579,417 and 2,579,418.

As indicated in the above patents, the reaction of a halosilane, having the above generic formula, with an ammonia or primary amine results in the substitution of an $NH_2$ or NHR amino group for each of the halogen atoms attached to the silicon. The reaction is normally conducted at temperatures below 0° C., in the absence of water, in order to avoid hydrolysis, and usually in the presence of an inert organic solvent. In many instances, it has been found that, simultaneously or immediately subsequent to the ammonolysis or aminolysis of the halosilanes, additional reactions will occur wherein certain of the resultant reaction products undergo polymerization, forming either chain type polymers or cyclic compositions as further disclosed hereinbelow. In fact, in many instances, it is difficult, if not impossible, to isolate the monomer of such reaction products.

In some instances, the ammonolysis or aminolysis reaction products of halosilanes are referred to as "aminosilanes," "silamines" or "silazanes." The term "silazanes" will, at times, be used herein in referring to the particular reaction products contemplated.

The halosilanes and their ammonolysis or aminolysis reaction products are also frequently described in terms of their functionality. Functionality is an indication of either the replaceable halogen atoms attached directly to the silicon or the amino groups which have replaced such halogen atoms. Thus, a halosilane having two replaceable halogen atoms attached directly to the silicon would be referred to as being difunctional as would the corresponding ammonolysis or aminolysis reaction products. Likewise, a halosilane having three or four replaceable halogen atoms attached directly to the silicon, as well as the derivative ammonolysis or aminolysis reaction products, would be referred to as being trifunctional or tetrafunctional, respectively. It is possible to have only one replaceable halogen atom attached to the silicon atom, in which event the corresponding amination product would be mono-functional. However, the present invention is only concerned with the ammonolysis or aminolysis reaction products of the di, tri, and tetrafunctional halosilanes or those halosilanes covered by the foregoing formula wherein $n$ has a value from 0–2. These products are generally characterized by the presence of an Si—N—Si linkage as a part of their molecular structure.

For purposes of the present invention, a variety of monovalent organic groups may be attached to the silicon atom of the halosilane, including the organic aliphatic and aromatic groups recited in the aforementioned Haber and Cheronis patents. In silazanes derived from difunctional halosilanes, wherein two organic groups are attached to the same silicon atom, the organic groups may be the same or may be different. Thus, for example, both an ethyl and either a methyl or benzyl hydrocarbon radical may be attached to the same silicon of a silazane silicon atom or further, both a methyl and a vinyl radical may be attached to the same silicon atom.

Various primary amines may be used if the silazanes are prepared by aminolysis. Typical amines are methylamine, ethylamine, allylamine, aniline, benzylamine and similar amines referred to in the Cheronis patents or mixtures of such amines.

The usual halosilanes subjected to ammonolysis or aminolysis are the chlorosilanes due to the fact that the latter compounds are more readily available and, also, due to the fact that the hydrogen chloride, formed as a by-product, may be easily removed. In general, the difunctional ammonolysis or aminolysis reaction products of the corresponding chlorosilanes have the characteristics of an oily liquid and are thoroughly stable in that they undergo no appreciable change at room temperatures or even moderately elevated temperatures. Most of the difunctional silazanes are considered to be cyclic, generally, either trimers or tetramers, such as hexamethyl cyclotrisilazane and octamethylcyclotetrasilazane, whose preparation and properties are disclosed in the aforementioned Haber patent.

Many of the trifunctional and tetrafunctional reaction products have been found to undergo polymerization over varying periods forming viscous liquids or solids, even, in some instances, at room temperature, unless kept in a suitable solvent. It is believed that such polymerized products comprise, for the most part, ring structures linked together forming chains. By selecting appropriate mixed halosilanes, compositions may be formed having properties intermediate of either a purely difunctional or a purely tri or tetrafunctional composition. Thus, for example, ammonia or a primary amine may be reacted with a mixture of dimethyldichlorosilane and methyltrichlorosilane, in either equal or unequal molar proportions, to give a reaction product having intermediate characteristics as compared to similar compositions derived from the dimethyldichlorosilane by itself or the methyltrichlorosilane by itself. Equimolar mixtures normally will not undergo polymerization at room temperature, at least to the extent of forming a solid, but rather require heating at elevated temperatures to obtain appreciable polymerization.

The present invention has, as one object, the improvement of resin-forming characteristics of silazanes comprising the ammonolysis or aminolysis reaction product of di, tri and tetrafunctional halosilanes or mixtures thereof and, particularly, the lower silazanes, such as the aforementioned trimers and tetramers to improve their adhesive, coating, film-forming and similar products.

Another object is the provision of a process whereby silazanes can be polymerized to a higher degree under less stringent conditions than heretofore found necessary.

In the copending application of Boyer, Serial No. 36,146, filed June 15, 1960, now U.S. Patent No. 3,143,-514, there has been disclosed and claimed the use of a catalyst from the class consisting of alkali metals or alkali metal amides to polymerize silazanes. The copending application of Parker, Serial No. 767,291, filed October 15, 1958, now U.S. Patent No. 3,007,886, discloses and claims the use of various hydrocarbon solvent soluble metallic salts of mono-carboxylic acids to improve the resin-forming characteristics of coating compositions. The particular metals involved in the latter application are iron, cerium, lead, zinc, manganese, calcium, zirconium, tin and cobalt.

In accordance with this invention, the polymeric or resin-forming characteristics of the silazanes are modified or enhanced by the use of a catalyst comprising the inorganic acid salts of metals from the class consisting of copper, silver, gold, zinc, cadmium, mercury, iron, cobalt and nickel. These metals may be further clarified in accordance with the Periodic Table. Thus, copper, silver and gold are grouped in Class $I_b$; zinc, cadmium and mercury in Class $II_b$; and iron, cobalt and nickel constitute the 4th Period of Class $VIII_b$. Preferred metals are silver, mercury and cobalt. The inorganic acids from which the salts may be derived are exemplified by hydrochloric acid, sulfuric acid, nitric acid, perchloric and phosphoric.

The extent to which silazanes may be further polymerized to viscous liquids or solids varies depending upon the particular type of silazanes. Thus, as previously indicated, those silazanes which are considered to be purely cyclic, for example, hexamethylcyclotrisilazane, are extremely resistant to further polymerization. In some instances, such silazanes have been rendered relatively viscous, evidencing further polymerization, after prolonged heat treatment at elevated temperatures. Silazanes of higher functionality are more readily susceptible to further polymerization, especially in the presence of heat. Accordingly, while the catalysts contemplated herein are applicable to all silazanes to improve and enhance their resin-forming or polymerization characteristics, they have particular utility in connection with the pure cyclic silazanes derived from the lower functional halosilanes.

The catalysts contemplated by the present invention may be added to the silazanes in varying amounts, extending, for example, from .01% to 10% by weight. However, as a practical matter, a maximum of about 2% by weight has been found suitable to obtain the desired conversion of most silazanes and, particularly, the relatively inert, purely cyclic silazanes, into products having a considerably higher degree of polymerization. In utilizing the invention, the catalyst is normally added to the silazane followed by heating to temperatures ranging up to about 200–220° C. for periods of, generally, from about one to twenty-four hours.

It will be appreciated that the amount of catalyst, temperatures and period of heat required will depend upon the particular catalyst and silazane. The most active catalysts are the inorganic acid salts of silver, mercury and cobalt.

When silazanes are converted into higher polymeric compositions by use of the catalysts as described herein, there is a noticeable evolution of ammonia, confirmed analytically by the loss of three active hydrogens for each amino nitrogen present. It is believed that the use of the catalysts contemplated results in a condensation and rearrangement of the silicon-nitrogen units, forming a molecular structure wherein more silicon atoms are attached directly to a single nitrogen atom to form a higher branched structure, although the mechanism involved has not been fully developed as of the present.

The following examples are set forth as further illustrating the invention.

*Example I*

10 cc. of clear liquid hexamethylcyclotrisilazane, $n_D^{26°}$ 1.4419 (prepared by the procedure of Example II of Haber Patent No. 2,462,635) and 0.1 gram of mercuric sulfate were mixed in a glass vessel immersed in an oil bath. The vessel was provided with a two foot glass tube extending from the mouth to the top thereof and secured in place by means of a cork, the glass tubing serving as an air-cooled reflux condenser. The contents of the vessel were heated at a temperature of 200° C. for a period of twenty-three hours. At the end of this period, the contents of the vessel constituted a clear, colorless, viscous liquid having a refractive index of $n_D^{26°}$ 1.4597.

*Example II*

Using the procedure of Example I, 10 cc. of clear liquid hexamethylcyclotrisilazane were subjected to $\frac{1}{10}$ gram of anhydrous cobaltous chloride. The resulting product consisted of a clear, colorless liquid containing solid needles and having a refractive index of $n_D^{26°}$ 1.4542.

*Example III*

10 ml. of a clear liquid (ASTM viscosity of 1 second) ammonolysis reaction product of equal molar proportions of dimethyldichlorosilane and trimethylchlorosilane were heated for sixteen hours at 200° C. with $\frac{1}{10}$ gram of silver nitrate in the manner employed in Example I. The resulting product was a dark silvery brown solid.

The catalysts herein disclosed may be used individually or in combination to achieve a relatively wide range of control over the polymerization of silazanes, and particularly, those silazanes, such as the aforementioned trimers and tetramers, which heretofore were considered substantially stable to further polymerization.

Among the advantages of the present are: the reduction in nitrogen content of silazanes while still retaining sufficient nitrogen-silicon bonds to permit their use in further reactions with hydroxyl or similar groups, converting relatively stable liquids to solids and increasing molecular weights. Another advantage of the catalysts disclosed and claimed in the present invention is based on the fact that they are practically insoluble in most instances in the silazanes. Accordingly, the salts may be easily separated from the silazanes after the desired polymerization advancement has been accomplished.

Having described certain exemplary embodiments of the present invention, the same is only intended to be limited by the scope of the following claims.

We claim:

1. A process for polymerizing silazanes of the unit formula

where R is of the group consisting of hydrogen and monovalent hydrocarbon radicals, $n$ has a value of 0 to 2, and in which the valences of the N atom not attached to silicon are attached to substituents of the group consisting of hydrogen atoms and monovalent hydrocarbon radicals, which process comprises subjecting said silazanes under anhydrous conditions to the action of an inorganic acid salt of a metal selected from the class consisting of copper, silver, gold, zinc, cadmium, mercury, iron, cobalt, and nickel.

2. A process for polymerizing the reaction product of a member of the class consisting of ammonia and primary amine with a halosilane having the formula

wherein R is a member of the class consisting of hydrogen and a monovalent hydrocarbon group and $n$ has a value from 0–2, said reaction product being characterized by having an

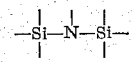

linkage as part of its molecular structure, which comprises subjecting said reaction product to the action of an inorganic acid salt of a metal selected from the class consisting of copper, silver, gold, zinc, cadmium, mercury, iron, cobalt and nickel.

3. A process for polymerizing the reaction product of a member of the class consisting of ammonia and primary amine with a halosilane having the formula

wherein R is a monovalent hydrocarbon group, said reaction product being characterized by having an

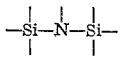

linkage as part of its molecular structure, which comprises subjecting said reaction product under anhydrous conditions to the action of an inorganic acid salt of a metal selected from the class consisting of copper, silver, gold, zinc, cadmium, mercury, iron, cobalt, and nickel.

4. A process as described in claim 3 wherein the metal is silver.

5. A process as described in claim 3 wherein the metal is mercury.

6. A process as described in claim 3 wherein the metal is cobalt.

7. A process for polymerizing the reaction product of a member of the class consisting of ammonia and primary amine with a halosilane having the formula $$RSiHal_3$$

wherein R is a monovalent hydrocarbon group, said reaction product being characterized by having an

linkage as part of its molecular structure, which comprises subjecting said reaction product under anhydrous conditions to the action of an inorganic acid salt of a metal selected from the class consisting of copper, silver, gold, zinc, cadmium, mercury, iron, cobalt and nickel.

8. A process as described in claim 7 wherein the metal is silver.

9. A process as described in claim 7 wherein the metal is mercury.

10. A process as described in claim 7 wherein the metal is cobalt.

11. The process of converting hexamethylcyclotrisilazane to a higher molecular weight product, which comprises subjecting said silazane under anhydrous conditions to the action of an inorganic acid salt of a metal selected from the class consisting of copper, silver, gold, zinc, cadmium, mercury, iron, cobalt and nickel.

12. The process of claim 11 wherein the metal is silver.

13. The process of claim 11 wherein the metal is mercury.

14. The process of claim 11 wherein the metal is cobalt.

15. The process of converting octamethylcyclotetrasilazane to a higher molecular weight product which comprises subjecting said silazane under anhydrous conditions to the action of an inorganic acid salt of a metal selected from the class consisting of copper, silver, gold, zinc, cadmium, mercury, iron, cobalt and nickel.

16. The process of claim 15 wherein the metal is silver.

17. The process of claim 15 wherein the metal is mercury.

18. The process of claim 15 wherein the metal is cobalt.

References Cited by the Examiner
UNITED STATES PATENTS 2,564,674   8/51   Cheronis _____ 260—2
3,007,886  11/61   Parker _____ 260—2

OTHER REFERENCES

Minne et al.: Journal American Chemical Society, vol. 82, pp. 5625–8, Nov. 5, 1960.

MURRAY TILLMAN, *Primary Examiner.*

L. N. BURSTEIN, WILLIAM H. SHORT, *Examiners.*